(12) United States Patent
Garoutte et al.

(10) Patent No.: US 7,822,224 B2
(45) Date of Patent: Oct. 26, 2010

(54) TERRAIN MAP SUMMARY ELEMENTS

(75) Inventors: Maurice V. Garoutte, Dittmer, MO (US); Jesse J. Chounard, II, Ballwin, MO (US)

(73) Assignee: Cernium Corporation, Reston, VA (US)

( * ) Notice: Subject to any disclaimer, the term of this patent is extended or adjusted under 35 U.S.C. 154(b) by 1063 days.

(21) Appl. No.: 11/471,865

(22) Filed: Jun. 21, 2006

(65) Prior Publication Data

US 2006/0290706 A1    Dec. 28, 2006

Related U.S. Application Data

(60) Provisional application No. 60/692,922, filed on Jun. 22, 2005.

(51) Int. Cl.
G06K 9/00 (2006.01)
G06K 9/40 (2006.01)
H04N 7/18 (2006.01)

(52) U.S. Cl. .................. 382/100; 382/165; 382/269; 348/144; 348/154

(58) Field of Classification Search ................ 382/103, 382/171, 173, 194, 205, 273, 269, 274, 165, 382/107, 162, 221; 348/154, 169, 143, 240.16, 348/144
See application file for complete search history.

(56) References Cited

U.S. PATENT DOCUMENTS

| 4,081,830 A | 3/1978 | Mick et al. |
| 4,623,837 A | 11/1986 | Efron et al. |
| 4,679,077 A | 7/1987 | Yuasa et al. |
| 4,737,847 A | 4/1988 | Araki et al. |
| 4,774,570 A | 9/1988 | Araki |
| 4,777,526 A | 10/1988 | Saitoh et al. |
| 4,814,869 A | 3/1989 | Oliver, Jr. |
| 4,943,854 A | 7/1990 | Shiota et al. |
| 5,033,015 A | 7/1991 | Zwirn |

(Continued)

FOREIGN PATENT DOCUMENTS

EP      0 482 427 A2    4/1992

(Continued)

OTHER PUBLICATIONS

A Notification Concerning Transmittal of International Preliminary Report on Patentability for Int'l Appl. No. PCT/US2006/024458, 5 pages, dated Jan. 10, 2008.

(Continued)

*Primary Examiner*—Vu Le
*Assistant Examiner*—Andrae S Allison

(57) ABSTRACT

Method and system for image data analysis, by making use of a Terrain Map Summary Element (TMSE) data structure, in which a Terrain Map data structure provides processed primitive data about each 2×2 kernel of pixels from an original image. The new TMSE is a hierarchical multiple-level or tiered structure of such Terrain Map elements, in which each successive Terrain Map level summarizes, for example, 16 lower level elements or member. By providing such a hierarchical nature of the map elements, richness is enhanced by each higher element because every element of each successively higher level map summarizes the data from elements of the lower level map. For example, in a five-level Terrain Map Summary Element structure according to the disclosure, each element or member of the fifth level contains information summarizing data about 256K pixels.

23 Claims, 3 Drawing Sheets
(3 of 3 Drawing Sheet(s) Filed in Color)

U.S. PATENT DOCUMENTS

| | | |
|---|---|---|
| 5,142,367 A | 8/1992 | Hong |
| 5,161,107 A | 11/1992 | Mayeaux et al. |
| 5,272,527 A | 12/1993 | Watanabe |
| 5,289,275 A | 2/1994 | Ishii et al. |
| 5,455,561 A | 10/1995 | Brown |
| 5,537,483 A | 7/1996 | Stapleton et al. |
| 5,596,364 A | 1/1997 | Wolf et al. |
| 5,600,574 A | 2/1997 | Reitan |
| 5,602,585 A | 2/1997 | Dickinson et al. |
| 5,666,157 A | 9/1997 | Aviv |
| 5,671,009 A | 9/1997 | Chun |
| 5,689,443 A | 11/1997 | Ramanathan |
| 5,731,832 A | 3/1998 | Ng |
| 5,734,740 A | 3/1998 | Benn et al. |
| 5,751,844 A | 5/1998 | Bolin et al. |
| 5,754,225 A | 5/1998 | Naganuma |
| 5,761,326 A | 6/1998 | Brady et al. |
| 5,764,803 A | 6/1998 | Jacquin |
| 5,827,942 A | 10/1998 | Madsen et al. |
| 5,875,305 A | 2/1999 | Winter et al. |
| 5,880,775 A | 3/1999 | Ross |
| 5,915,044 A | 6/1999 | Gardos |
| 5,930,379 A | 7/1999 | Rehg et al. |
| 5,956,424 A | 9/1999 | Wootton et al. |
| 5,969,755 A | 10/1999 | Courtney |
| 6,018,303 A | 1/2000 | Sadeh |
| 6,031,573 A | 2/2000 | MacCormack et al. |
| 6,067,373 A | 5/2000 | Ishida et al. |
| 6,078,619 A | 6/2000 | Monro |
| 6,097,429 A | 8/2000 | Seeley et al. |
| 6,104,831 A | 8/2000 | Ruland |
| 6,154,133 A | 11/2000 | Ross et al. |
| 6,278,793 B1 | 8/2001 | Gur et al. |
| 6,366,701 B1 | 4/2002 | Chalom et al. |
| 6,370,480 B1 | 4/2002 | Gupta et al. |
| 6,377,299 B1 | 4/2002 | Hamada |
| 6,396,961 B1 | 5/2002 | Wixson et al. |
| 6,424,370 B1 | 7/2002 | Courtney |
| 6,424,741 B1 | 7/2002 | Shin et al. |
| 6,476,858 B1 | 11/2002 | Diaz et al. |
| 6,493,022 B1 | 12/2002 | Ho et al. |
| 6,493,023 B1 | 12/2002 | Watson |
| 6,493,024 B1 | 12/2002 | Hartley et al. |
| 6,493,041 B1 | 12/2002 | Hanko et al. |
| 6,502,045 B1 | 12/2002 | Biaglotti |
| 6,546,120 B1 | 4/2003 | Etoh et al. |
| 6,549,651 B2 | 4/2003 | Xiong et al. |
| 6,577,764 B2 | 6/2003 | Myler et al. |
| 6,577,826 B1 | 6/2003 | Misaizu et al. |
| 6,591,006 B1 | 7/2003 | Niemann |
| 6,597,800 B1 | 7/2003 | Murray et al. |
| 6,606,538 B2 | 8/2003 | Ponsot et al. |
| 6,628,323 B1 | 9/2003 | Wegmann |
| 6,650,774 B1 | 11/2003 | Szeliski |
| 6,654,483 B1 | 11/2003 | Bradski |
| 6,661,918 B1 | 12/2003 | Gordon et al. |
| 6,687,386 B1 | 2/2004 | Ito et al. |
| 6,690,839 B1 | 2/2004 | Ferguson |
| 6,696,945 B1 | 2/2004 | Venetianer |
| 6,700,487 B2 | 3/2004 | Lyons |
| 6,707,486 B1 | 3/2004 | Millet et al. |
| 6,751,350 B2 | 6/2004 | Crinon |
| 6,754,372 B1 | 6/2004 | Collobert |
| 6,760,744 B1 * | 7/2004 | Halaas et al. ............... 709/201 |
| 6,940,998 B2 * | 9/2005 | Garoutte .................... 382/103 |
| 7,023,453 B2 * | 4/2006 | Wilkinson .................. 345/643 |
| 7,038,710 B2 | 5/2006 | Caviedes |
| 7,440,589 B2 | 10/2006 | Garoutte |
| 7,136,605 B2 | 11/2006 | Tsunoda et al. |
| 7,218,756 B2 | 5/2007 | Garoutte |
| 7,239,311 B2 * | 7/2007 | Dunn et al. ................. 345/419 |
| 7,423,667 B2 | 9/2008 | Hayasaka |
| 7,474,759 B2 * | 1/2009 | Sternberg et al. ........... 382/100 |
| 7,643,653 B2 | 1/2010 | Garoutte |
| 2001/0033330 A1 | 10/2001 | Garoutte |
| 2003/0023910 A1 | 1/2003 | Myler et al. |
| 2003/0068100 A1 | 4/2003 | Covell et al. |
| 2003/0112333 A1 | 6/2003 | Chen et al. |
| 2003/0165193 A1 | 9/2003 | Chen et al. |
| 2003/0174212 A1 | 9/2003 | Ferguson |
| 2003/0219157 A1 | 11/2003 | Koide et al. |
| 2003/0228056 A1 | 12/2003 | Prakash et al. |
| 2004/0080623 A1 | 4/2004 | Cleveland et al. |
| 2004/0119848 A1 | 6/2004 | Beuhler |
| 2004/0184667 A1 | 9/2004 | Raskar et al. |
| 2004/0190633 A1 | 9/2004 | Ali et al. |
| 2005/0089194 A1 | 4/2005 | Bell |
| 2005/0146605 A1 | 7/2005 | Lipton et al. |
| 2005/0213815 A1 | 9/2005 | Garoutte |
| 2005/0219362 A1 | 10/2005 | Garoutte |
| 2006/0083440 A1 | 4/2006 | Chen |
| 2006/0126933 A1 | 6/2006 | Porikli |
| 2006/0221181 A1 | 10/2006 | Garoutte |
| 2006/0222206 A1 | 10/2006 | Garoutte |
| 2007/0263899 A1 | 11/2007 | Garoutte |

FOREIGN PATENT DOCUMENTS

| | | |
|---|---|---|
| EP | 0917103 | 5/1999 |
| WO | WO 98/19450 A2 | 5/1998 |
| WO | WO 98/28706 A1 | 7/1998 |
| WO | WO 98/56182 A | 12/1998 |
| WO | WO 99/05867 A | 2/1999 |
| WO | WO 00/01140 A2 | 1/2000 |
| WO | WO 01/57787 A1 | 8/2001 |
| WO | WO 98/47118 A1 | 10/2001 |
| WO | WO 2007/002382 A2 | 1/2007 |

OTHER PUBLICATIONS

Search Report, dated Apr. 2, 2007, for International Application No. PCT/US06/24458, 2 pgs.

Garoutte, Terrain Map, An Image Space For Machine Visiion. Sprial bound "white paper." Aug. 24, 2004, Revision 1.0. This paper was made of record in the parent application U.S. Appl. No. 09/773,475 as an Appendix to Declaration by Maurice V. Garoutte.

Gavrila, D.M., "The Visual Analysis of Human Movement: A Survey," Computer Vision and Image Understanding, Academic press, San Diego, CA, US, vol. 73, No. 1, pp. 82-98, Jan. 1, 1999.

International Search Report and Written Opinion dated Nov. 14, 2007 for International Application No. PCT/US2006/11358, 7 pages.

International Search Report and Written Opinion dated Sep. 25, 2006 for PCT/US2006/11627, 8 pages.

International Search Report and Written Opinion dated Aug. 29, 2005 for International Application No. PCT/US05/10030.

International Search Report dated Jun. 5, 2001 for International Application No. PCT/US01/03639.

International Preliminary Examination Report completed Nov. 2, 2001 for International Application No. PCT/US01/03639.

Rita Cucchiara, et al., Detecting Moving Objects, Ghosts and Shadows in Video Streams; in IEEE Transactions on Pattern Analysis and Machine Intelligence, vol. 25, N. 10, pp. 1337-1342, 2003.

Sen-Ching S. Cheung, et al., Robust techniques for Background substraction in Urban Traffic Video; research paper, 12 pages; Center for Applied Scientific Computing Lawrence Livermore National Laboratory, Livermore, California USA.

Search Report/Written Opinion dated Jun. 22, 2009 for Singapore Patent Application No. 200606650-0.

Stefano, et al., "A Charge-Detection Algorithm Based on Structure and Colour," Proceedings of the IEEE Conference on Advanced Video and Signal Based Surveillance, 7 pages.

Supplementary European Search Report dated Oct. 27, 2005 for European Application No. 01910417.3.

U.S. Office Action mailed Apr. 3, 2009, for U.S. Appl. No. 11/393,430, filed Mar. 30, 2006.

U.S. Office Action mailed Apr. 3, 2009 for U.S. Appl. No. 11/159,375, filed Jun. 22, 2005.
U.S. Office Action mailed Sep. 4, 2009 for U.S. Appl. No. 11/393,430, filed Mar. 30, 2006.
U.S. Office Action mailed Aug. 25, 2009 for U.S. Appl. No. 11/393,046, filed Mar. 30, 2006.
U.S. Office Action mailed Aug. 23, 2005, for U.S. Appl. No. 11/088,308, filed Mar. 24, 2005.
U.S. Office Action mailed Feb. 17, 2006, for U.S. Appl. No. 11/088,308, filed Mar. 24, 2005.
U.S. Office Action mailed Jun. 23, 2004, for U.S. Appl. No. 09/773,475, filed Feb. 1, 2001.
U.S. Office Action mailed May 14, 2007, for U.S. Appl. No. 11/093,772, filed Mar. 30, 2005.
U.S. Office Action mailed Nov. 8, 2007, for U.S. Appl. No. 11/748,320, filed May 14, 2007.
Haritaoglu et al., W4: Real-Time Surveillance of People and Their Activities, IEEE Transactions on Pattern Analysis and Machine Intelligence, Aug. 2000, pp. 809-830, vol. 22, No. 8.
International Search Report and Written Opinion for International Application No. PCT/US05/10826, mailed Jun. 6, 2007.
L. Gibson, et al., "Vectorization of raster images using hierarchical methods" Computer Graphics and Image Processing, vol. 20, No. 1, Sep. 1982, pp. 82-89.
C. Schmid, "Weakly Supervised Learning of Visual Models and Its Application to Content-Based Retrieval" International Journal of Computer Vision, Kluwer Academic Publishers, BO, vol. 56, No. 1-2, Jan. 1, 2004, pp. 7-16.
Supplementary European Search Report dated Mar. 18, 2010 for European Patent Application No. 06785424.0.

* cited by examiner

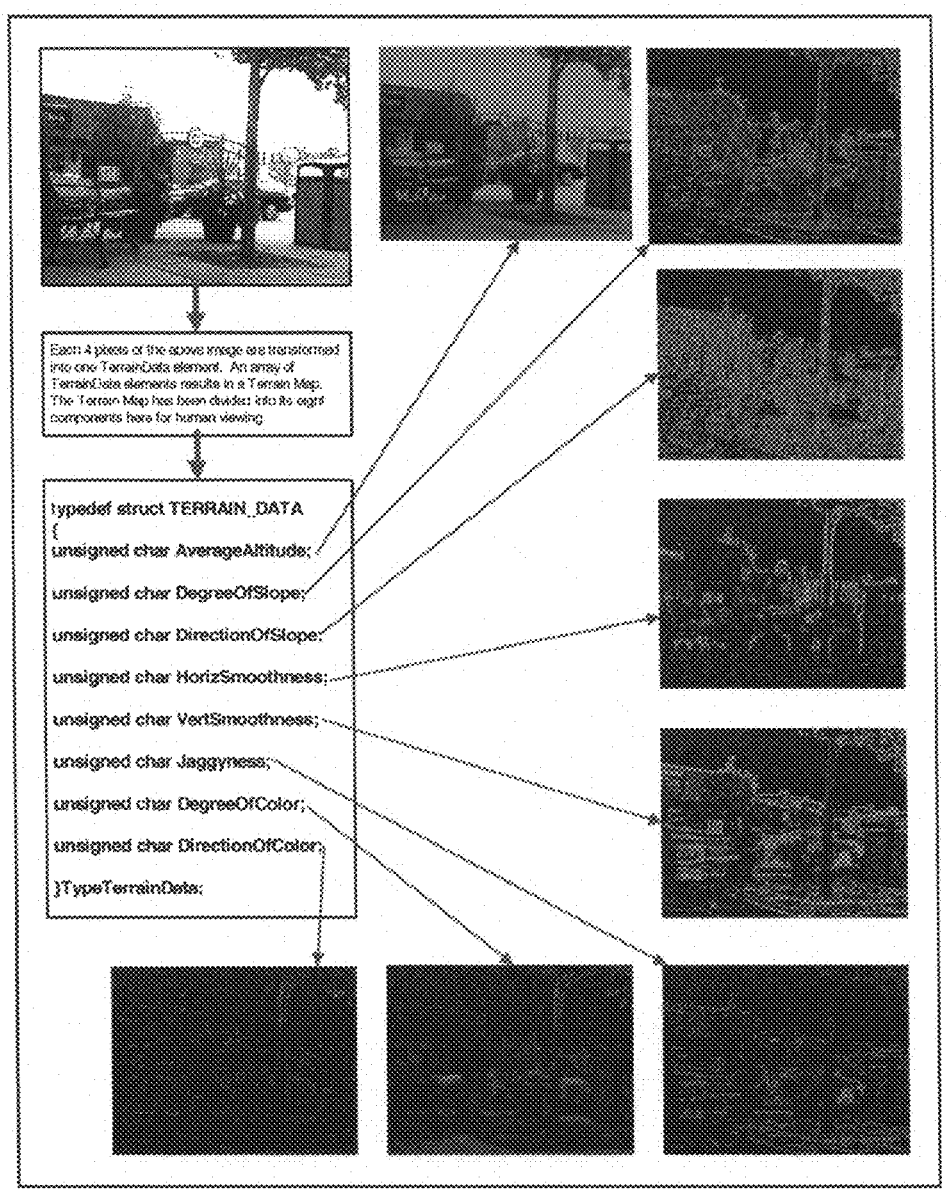
Figure 1 Terrain Map Structure

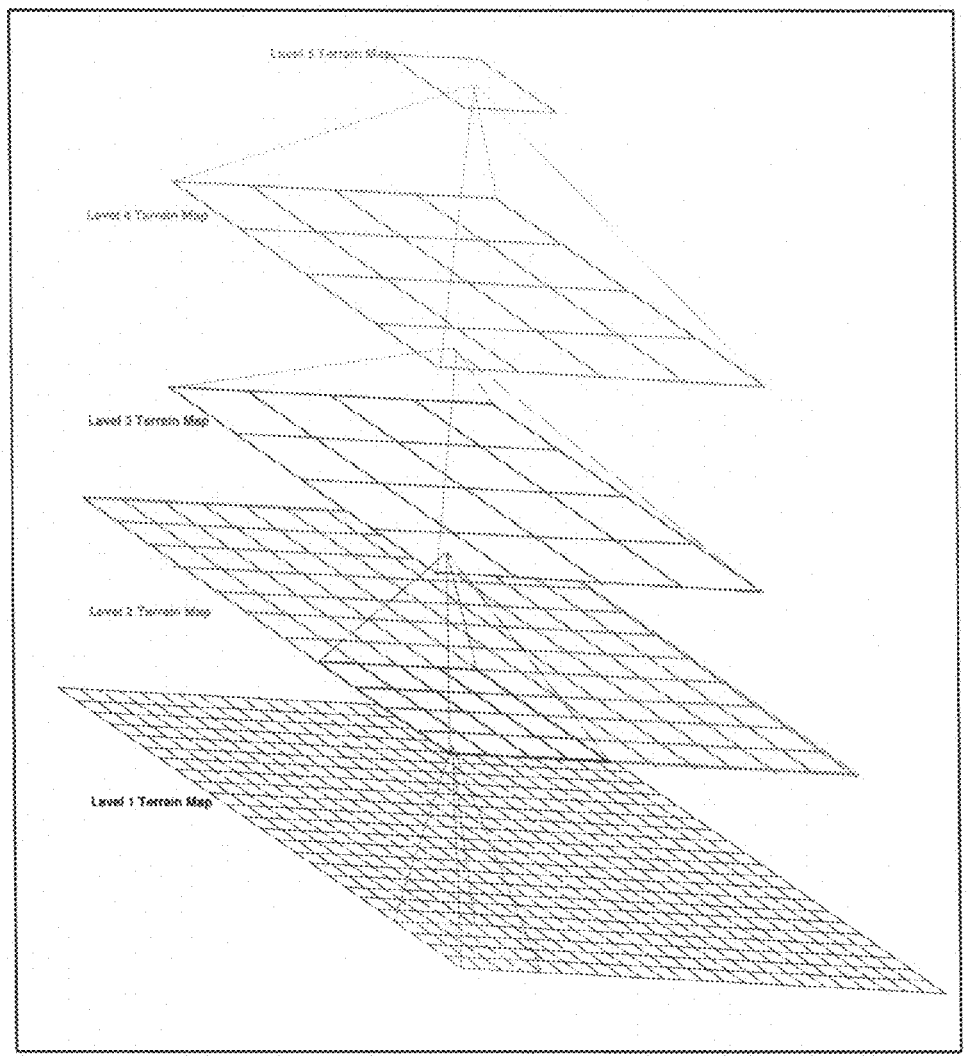
Figure 2 Hex Tree Terrain Map Structure

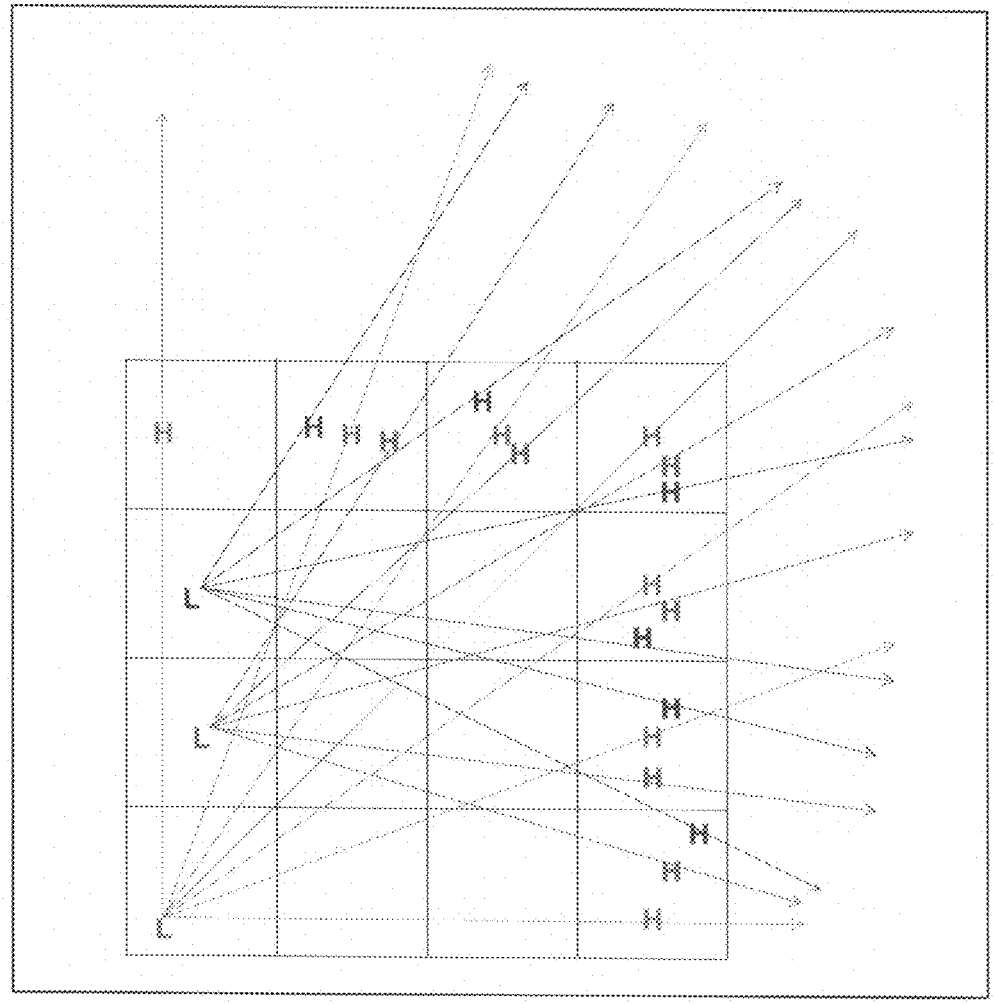
Figure 3 Basis of LevelDirectionSlope

TERRAIN MAP SUMMARY ELEMENTS

CROSS-REFERENCE TO RELATED APPLICATION(S)

This application is based upon and claims priority of U.S. provisional patent application invention Ser. No. 60/692,922 entitled Terrain Map Summary Elements, filed Jun. 22, 2005, on behalf of the present inventors.

BACKGROUND OF THE INVENTION

This invention applies to the field of image understanding as opposed to the field of image processing.

As used herein the term "image processing" applies to computer operations that have pixels as both input and output. Examples include smoothing, threshold, dilation, and erosion. In each of those image processing operations, a buffer of pixels is the input to the operation and a buffer of pixels is the output of the operation. Each pixel in the input and output contains only brightness information.

The term "image understanding" as used herein applies to computer operations where the pixels in the image buffers are grouped into higher level constructs and described with symbolic data. Subsequent image understanding operations can be performed on the symbolic data without referring to the original pixels. This invention anticipates that there will be multiple levels of abstraction between the lowest (pixel) level and the ultimate understanding of objects in a context. An initial step in creating higher levels of abstraction for image understanding was the invention of what is termed the Terrain Map, an element discussed below.

There has been developed a system of the present inventor in accordance with copending patent application owned by the present applicant's assignee/intended assignee, namely application Ser. No. 09/773,475, filed Feb. 1, 2001, published as Pub. No.: US 2001/0033330 A1, Pub. Date: Oct. 25, 2001, entitled System for Automated Screening of Security Cameras, also called a security system, and corresponding International Patent Application PCT/US01/03639, of the same title, filed Feb. 5, 2001, both hereinafter referred to the Perceptrak disclosure or system, and herein incorporated by reference. That system may be identified by the mark PERCEPTRAK ("Perceptrak" herein), which is a registered trademark (Regis. No. 2,863,225) of Cernium, Inc., applicant's assignee/intended assignee.

In the Perceptrak disclosure, video data is picked up by any of many possible video cameras. It is processed by software control of the system before human intervention for an interpretation of types of images and activities of persons and objects in the images. It disclosed the concept of an element called Terrain Map as an image format for machine vision. In that original implementation, the Terrain Map element has one Terrain Map element for each four pixels of the original image with each Terrain Map member in turn having eight members or primitives describing a 4×4 pixel neighborhood adjacent to the four pixels per map element.

In the Perceptrak system real-time image analysis of video data is performed wherein at least a single pass of a video frame produces a Terrain Map which contains parameters (primitives or members) indicating the content of the video. Based on the parameters of the Terrain Map, the Perceptrak system is able to make decisions and derive useful information about image, such as discriminating vehicles from pedestrians and vehicle traffic from pedestrian traffic.

Terrain Map Derivation

Starting with the recognition that all existing raster diagrams are brightness maps arranged for efficient display for human perception, the Terrain Map was designed to provide additional symbolic data for subsequent analysis steps. Using the analogy of geographic maps, the concept of a Terrain Map was proposed as a means of providing additional data about an image.

In such Terrain Map each of the map member contains symbolic information describing the conditions of that part of the image somewhat analogous to the way a geographic map represents the lay of the land. The Terrain Map members are:

AverageAltitude is an analog of altitude contour lines on a Terrain Map. Or when used in the color space, the analog for how much light is falling on the surface.

DegreeOfSlope is an analog of the distance between contour lines on a Terrain Map. (Steeper slopes have contour lines closer together.)

DirectionOfSlope is an analog of the direction of contour lines on a map such as a south-facing slope.

HorizontalSmoothness is an analog of the smoothness of terrain traveling North or South.

VerticalSmoothness is an analog of the smoothness of terrain when traveling East or West.

Jaggyness is an analog of motion detection in the retina or motion blur. The faster objects are moving the higher the Jaggyness score will be.

DegreeOfColor is the analog of how much color there is in the scene where both black and white are considered as no color. Primary colors are full color.

DirectionOfColor is the analog of the hue of a color independent of how much light is falling on it. For example a red shirt is the same red in full sun or shade.

The three members used for the color space, AverageAltitude, DegreeOfColor, and DirectionOfColor represent only the pixels of the element while the other members represent the conditions in the neighborhood of the element. In the current implementation, one Terrain Map element represents four pixels in the original raster diagram and a neighborhood of a map element consists of an 8×8 matrix surrounding the four pixels. The same concept can be applied with other ratios of pixel to map element and other neighborhood sizes.

FIG. 1 illustrates the Terrain Map structure and depicts graphically the creation of the structure of the Terrain Map such that the Terrain Map provides eight parameters (primitive data) about the neighborhood of pixels in an image buffer. The Terrain Map allows symbolic comparison of different buffers based on the eight parameters, i.e., terrain data members, without additional computer passes through the pixels.

Accordingly there is realized in the Perceptrak disclosure a computer system for automated screening of video cameras, such as security cameras, said computer system in communication with a plurality of video cameras and comprising real-time image analysis components wherein video image data from said video cameras is analyzed by said image analysis components and said video image data is then selectively presented to an operator for security monitoring, said system providing real-time analysis of said video image data for subject content and including:

(a) provision for performing at least one pass through a frame of said video image data; and (b) provision for generating a Terrain Map from said pass through said frame of said video image data, said Terrain Map comprising a plurality of parameters wherein said parameters indicate the content of said video image data;

said Terrain Map containing in said plurality of parameters characteristic information regarding the content of the video, the characteristic information being based on each of kernels of pixels in an input buffer, the characteristic information comprising at least a number of bytes of data describing the relationship of each of a plurality of pixels in a larger kernel surrounding the first-said kernel.

Other aspects of the Perceptrak disclosure are important and should be understood preliminary to a more complete understanding of the present invention.

SUMMARY OF THE INVENTION

The current invention builds on the concept of a Terrain Map and creates a hierarchical tree of symbolic data structures with each successive step in the tree summarizing more by providing summaries based upon the underlying Terrain Map or Terrain Map Summary Element members. The intent and benefits of such a procedure can be seen as being not primarily to reduce the quantity of data from the original image buffer but rather as creating a richer construct that is better suited to machine vision.

An immediate system benefit or object is the facilitation of grouping of lower level members based on similarities of the symbolic data.

A benefit or object of the invention outside the field of real time image understanding is the creation of symbolic descriptors of images to enable retrieval of images from large image databases by querying on the content.

It is an additional benefit or object to obtain hierarchical data about primitives or members derived from image data, wherein the hierarchical data provides higher level descriptions of the underlying primitives or members, and wherein the hierarchical data contributes to image understanding, most especially when such image understanding must be realized at the machine level.

Other benefits of the invention include, among still others, the creation and capture of symbolic descriptions of images to enable still further analysis, as by machine implementation, useful in the fields of subject, pattern, positional, symbolic, topological, topographical and/or relational analysis, such as for example the recognition of symmetry or asymmetry or departures from a norm within images in such a way as to enable machine recognition of the nature of objects and images. Use of the invention may also aid probability and statistical analysis of subjects within image fields, particularly as it relates to machine recognition of data elements for such analysis.

Briefly, the invention relates to a system and method for analysis of video or other digital image data for subject content, said method comprising the steps of:

(a) performing at least one pass through a frame of said image data; and (b) generating a base Terrain Map from said pass through said frame of said image data, said base Terrain Map being an element which comprises a plurality of data members which indicate the content of said image data, (c) generating at least one upper tier Terrain Map Summary Element hierarchically removed from said Terrain Map, said upper tier Terrain Map Summary Element comprising hierarchical data members in the form of a plurality of descriptive aspects indicating the content of said Terrain Map members.

There is accordingly disclosed a method and system for image data analysis, by making use of a Terrain Map Summary Element data structure, in which the Terrain Map provides processed primitive data about each 2×2 kernel of pixels from an original image. The new data structure is a hierarchical multiple-level or tiered structure of Terrain Map elements, in which each successive Terrain Map level summarizes, for example 16 lower level elements or member. By providing such a hierarchical nature of the map elements, richness is enhanced by each higher element because every element of each successively higher level map summarizes the data from elements of the lower level map. For example, in a five-level Terrain Map Summary Element structure according to the disclosure, each element or member of the fifth level contains information summarizing data about 256K pixels. Each such tier thus adds to the richness of the hierarchical data obtained.

Other objects, advantages and features will be apparent from the description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 illustrates the Terrain Map structure or element with which the present invention is concerned, such Terrain Map element providing processed primitive data members about a neighborhood (kernel) of pixels from an original image to enable fast machine analysis of images, as the image such as video data resides in an image buffer.

FIG. 2 is a Hex Tree Terrain Map structure of a five level Hex Tree Terrain Map in which every member of each successively higher level summary member analyzes the data from a predetermined members of a next lower level.

FIG. 3 shows the exemplary plot of the summary member LevelDirectionSlope for each of predetermined Terrain Map Summary Elements in which outer element members are tested for the highest and lowest of the function value AverageAltitude and the direction of slope is calculated by the vector from the center of the lowest element to the center of the highest element. The figure serves to illustrate the basis of the function LevelDirectionSlope.

DESCRIPTION OF A PRACTICAL EMBODIMENT

Methodology of the present invention is related to, and useful for, deriving data from captured images where the data is of a form to be used to advantage for machine vision or machine interpretation thereof, as opposed to human vision. It will be understood accordingly that, rather than scanned video, such as that captured by video camera imaging, the present invention is directed to deriving and using data from which machine-implemented decisions can be made.

More specifically, the present disclosure is concerned with a Terrain Map, as set forth in said Perceptrak disclosure, wherein additional information of value regarding primitives derived from image scans is gained by creating a hierarchical tree of symbolic data structures with each successive step in the tree summarizing more of the underlying image. Upon first impression, this would appear to provide a narrowing of bandwidth by reducing the data derived by use of the Terrain Map. However, the intent of such a procedure is not necessarily to reduce the quantity of data from the original image buffer but rather to create what is regarded as a richer construct better suited to machine vision.

For example of a system of usage of such a richer construct, reference is made to the Perceptrak disclosure, a computer system developed for automated screening of video cameras. Said system is in communication with a plurality of video cameras and comprises real-time image analysis components wherein video image data from the video cameras is analyzed by the image analysis components. The video image data is then selectively presented to an operator for monitoring, wherein said computer system further comprises at least one video worker, said video worker capturing video image data from said video cameras; but machine-implemented decision must be made about which video from which video camera (from among many, potentially hundreds of cameras) should be displayed. Such system thus includes at least one analysis worker that receives said video data from the video worker in the form of frames of image data and performs image analysis on said video data to provide data about activities in the image data. The analysis worker in turn comprises:

(a) provision for performing at least one pass through such a frame of said image data; and (b) provision for generating said Terrain Map from such a pass through the frame of image data, and Terrain Map comprises a plurality of parameters wherein said parameters indicate the content of said image data.

Said Terrain Map contains in said plurality of parameters characteristic information regarding the content of the video, the characteristic information being based on each of kernels of pixels in an input buffer, the characteristic information comprising at least a number of bytes of data describing the relationship of each of a plurality of pixels in a larger kernel surrounding the first-said kernel.

In the Perceptrak system, analysis of information derived from the Terrain Map allows the system to novel image analysis techniques which allow the system to make decisions about which camera an operator should view based on the presence and activity of vehicles and pedestrians. Events are associated with both vehicles and pedestrians and include, but are not limited to, single pedestrian, multiple pedestrians, fast pedestrian, fallen pedestrian, lurking pedestrian, erratic pedestrian, converging pedestrians, single vehicle, multiple vehicles, fast vehicles, and sudden stop vehicle. The image analysis techniques are also able to discriminate vehicular traffic from pedestrian traffic by tracking background images and segmenting moving targets. Vehicles are distinguished from pedestrians based on multiple factors, including the characteristic movement of pedestrians compared with vehicles, i.e. pedestrians move their arms and legs when moving and vehicles maintain the same shape when moving. Other factors which can be used include subject aspect ratio and smoothness, for example, pedestrians are taller than vehicles and vehicles are smoother than pedestrians, and can be distinguished thereby.

Hierarchical Terrain Map Structures

The Terrain Map Structure set forth in the Perceptrak disclosure enables extremely fast and highly efficient machine analysis of images by providing pre-processed primitive data about each 2×2 kernel of pixels from the original image.

As according to the Perceptrak disclosure, processed data from the Terrain Map results in the generation of several parameters for further image analysis. The parameters include: (1) Average Altitude; (2) Degree of Slope; (3) Direction of Slope; (4) Horizontal Smoothness; (5) Vertical Smoothness; (6) Jaggyness; (7) Color Degree; and (8) Color Direction.

The current invention builds on that structure by implementing a hierarchical structure of Terrain Map elements. Many additional parameters for further image analysis can be generated.

Hex Tree Structure

The Terrain Map Structure set forth in the Perceptrak disclosure enabled fast machine analysis of images by providing pre-processed primitive data about each 2×2 kernel of pixels from the original image. The current invention improves and builds upon that structure by implementing a hierarchical structure of Terrain Map elements. The descriptions herein are based on a Hex Tree structure where each successive Terrain Map level summarizes 16 lower level elements. These may here be considered first level elements. The present invention is characterized by the hierarchical nature of the map elements and the richness of each element, not by the 16:1 ratio between levels. The present hierarchical concept can be applied to provide a Quad Tree using a 4:1 ratio between levels.

FIG. 2 illustrates the structure of a five-level Hex Tree Terrain Map where every element of each successively higher level map summarizes the data from 16 elements of the lower level map. In using a five-level map, each element of level five contains summarized data about 256K pixels.

It will be understood that the use of 16 elements is illustrative, being premised on the use of Terrain Map which has one Terrain Map element for each four pixels of an original image with each Terrain Map element having eight members describing a 4×4 pixel neighborhood adjacent to the four pixels per map element. In one implementation of the Terrain Map as carried out by the Perceptrak disclosure system, one Terrain Map element represents four pixels in the original raster diagram and a neighborhood of a map element consists of an 8×8 matrix surrounding the four pixels. Recognize accordingly that the same concept can be applied with other ratios of pixel to map element and other sizes of neighborhood.

Terrain Map Summary Elements (TMSE)

The current invention extends in a significant way the concept of a Terrain Map and creates a hierarchical tree of symbolic data structures each containing multiple descriptor elements and with each successive step upward in the tree summarizing by its descriptor elements more of the underlying image. To distinguish such upper levels of the hierarchical Terrain Map concept from the first level elements, all upper level element with a richer member set are referred to as Terrain Map Summary Elements and the acronym TMSE is hereby coined to mean Terrain Map Summary Elements, signifying both a set of elements and the elements thereof.

Because each level of TMSE describes increasing numbers of pixels, it is appropriate to recognize that the TMSE member set is richer than the Terrain Map element. Following the inspiration of a map of geographical terrain, such as a topographic chart, the members of the TMSE are named (where appropriate) after features of a landscape, simply as a matter of convenient reference as according to the arbitrary use of the new term Terrain Map by the present inventors, having first been used by the inventor of the Perceptrak system in said Perceptrak disclosure. Thus the term Terrain Map used herein does not relate in any way to maps of geographic terrain other than by way of lexicographic inspiration.

Referring to FIG. 1, a Terrain Map structure is established in accordance with the technique or method set out in the Perceptrak disclosure by which to provide pre-processed primitive data about kernels of pixels from an original image to enable fast machine analysis of images. The hierarchical tree of symbolic data structures is created by beginning with the first Terrain Map as according to the Perceptrak disclosure, and proceeding by successive steps upward, according to a desire to implement a predetermined of summary elements, with the summary elements of the first Terrain Map each summarizing an aspect of the underlying image, and the summary elements of each next Terrain Map upwardly being a measurement of one or more attributes or summarizing data derived in the Terrain Map immediately below.

Thus, FIG. 1 illustrates creation of the Terrain Map structure with which the present invention is concerned. The Terrain Map structure provides processed primitive data elements about a neighborhood (kernel) of pixels from an original image such as video data as may reside in an image buffer. In FIG. 1 the Terrain Map structure is depicted graphically as the creation of the data structure called Terrain Map which provides eight parameters (primitive data) about the neighborhood of pixels in the image buffer (not shown). The Terrain Map allows symbolic comparison of different buffers based on the eight parameters, i.e., descriptor elements which are terrain data elements, without additional computer passes through the pixels.

In such a computer system the descriptor members or parameters comprise:

an average altitude parameter which measures an average value of four pixels in the center of a 2×2 kernel in said frame of said video image data; called AverageAltitude a degree of slope parameter which measures an absolute difference between a highest average value and a lowest average value calculated by said average altitude; called DegreeOfSlope direction of slope parameter which measures a direction of slope based on said highest average value and said lowest average value calculated by said average altitude; called DirectionOfSlope a horizontal smoothness parameter which measures a consistency of change in AverageAltitude across the kernel from left to right; called HorizSmoothness a vertical smoothness parameter which measures a consistency of change in AverageAltitude across the kernel from top to bottom; called VertSmoothness a jaggyness parameter which measures an offset in pixels between odd and even fields for a target segmented from said frame of said video image data; called Jaggyness a degree of color parameter; called DegreeOfColor a direction of color parameter; called DirectionOfColor In the Perceptrak disclosure, said parameters or descriptor members are generated by color space calculations which comprise a color degree parameter which measures how far a color is from gray scale, and a color direction parameter which measures color based on a two-dimensional color analysis.

With specific reference to FIG. 1, each 4 pixels of the an image are transformed into one Terrain Data element. An array of Terrain Data elements results in a Terrain Map. In FIG. 1, the Terrain Map has been divided visually into its eight components for human viewing. The Terrain Map need not be so divided visually for machine implementation, as in the Perceptrak disclosure.

The descriptor elements of said Terrain Map thus constitute a plurality of parameters or descriptor elements which are characteristic information regarding the content of the video, the characteristic information being based on each of kernels of pixels in an input buffer, the characteristic information comprising at least a number of bytes of data describing the relationship of each of a plurality of pixels in a larger kernel surrounding the first-said kernel.

The procedure is sequentially extended to provide successive tiers (levels) of hierarchical data to form Tree Terrain Map structure having multiple levels wherein every element of each successively higher level Terrain Map summarizes the data from a predetermined elements of a next lower level Terrain Map.

The system procedure or method for analysis of data for subject content comprises the steps of:

(a) performing at least one pass through a frame of said image data; and (b) generating a base (Level 1) Terrain Map from said pass through said frame of said image data, said base level Terrain Map comprising a plurality of base data members in the form of primitives that indicate the content of said image data, for example, video data of a video data frame held momentarily or otherwise in an image buffer as the data is captured by a video camera.

(c) generating at least one upper tier Terrain Map Summary (here, Level 2) hierarchically removed from said base Terrain Map, said upper tier Terrain Map Summary comprising a plurality of elements indicating, as in the form corresponding to said primitives, the content of said base data elements (members) of the base level Terrain Map.

In like manner, the method most preferably involves successively generating tiers Terrain Map Summary tiers above the Level 2 tier, one above the other, each containing a plurality of members indicating the content of data elements of the tier immediately below it, and thereby richly indicative of the original data.

The successive tiers of hierarchical data, identified as Levels 1, 2, 3, 4 and 5, thereby provide a Hex Tree Terrain Map Summary structure of a five-level Hex Tree Terrain Map Summary in which every element of each successively higher level Terrain Map Summary summarizes the data from a predetermined of members of a next lower level Terrain Map Summary.

The nature of the hierarchical data is explained below, it being understood that in each tier or level of the Terrain Map Summary structure, the data elements represent information derived from the original image, but not the image itself. That is, in the case of analysis of images, or successive video images, or frames of video images, at least one pass is made through a frame of such data to derive functional descriptor elements based upon or derived from the content of the original image data as according to specific functions described in the Perceptrak disclosure and as further set forth below.

FIG. 3 shows an exemplary plot of the function LevelDirectionSlope for each of a predetermined number of Terrain Map Summary Elements in which outer elements are tested for the highest and lowest of the function value AverageAltitude and the direction of slope is calculated by the vector from the center of the lowest element to the center of the highest element. The figure serves to illustrate the basis of the function LevelDirectionSlope.

The members of the TMSE described below represent the intention of the present invention to provide a rich symbolic description of groups of pixels. The entire set is not required by the concept of hierarchical Terrain Maps. Thus, a predetermined number of TMSE members may be selected as according to a desired purpose. All of the described members are envisioned as eight bit values except two: ComAltDiff and AvgAltDiff. ComAltDiff and AvgAltDiff apply only to the process of segmentation between foreground and background images. All other members apply to both segmentation and generic image description. Representative TMSE members are:

AverageAltitude: The average of the AverageAltitude elements of all subordinate Terrain Map elements.

Flatness: A measure of the consistency of the altitudes of the underlying level one map elements. If all included level one map elements have the same AverageAltitude, then Flatness is full scale 200.

ComAltitude: The most frequently occurring altitude of the subordinate Terrain Map elements.

AvgDegreeOfSlope: The average of the DegreeOfSlope of all subordinate Terrain Map elements above a given threshold.

ComDegreeOfSlope: The most frequently occurring DegreeOfSlope of all subordinate Terrain Map elements above a given threshold.

DegreeOfSlopeRegularity: A measure of the consistency of the DegreeOfSlope of the underlying elements.

PercentWithSlope: The percent of DegreeOfSlope members above a given threshold.

PercentVerSlope: The percent of slopes above a given threshold that are vertical.

PercentHorSlope: The percent of slopes above a given threshold that are horizontal.

PercentAmbSlope: The percent of slopes above a given threshold that are ambiguous.

AvgHorSmoothness: The average of the HorzontalSmoothness of all subordinate Terrain Map elements.

ComHorSmoothness: The most frequently occurring HorzontalSmoothness of all subordinate Terrain Map elements.

HorRegularity: A measure of the consistency of the HorizontalSmoothness of the underlying level one map elements. If all included level one map elements have the same HorzontalSmoothness, then HorRegularity is full scale 200.

AvgVerSmoothness: The average of the VerticalSmoothness of all subordinate Terrain Map elements.

ComVerSmoothness: The most frequently occurring VerticalSmoothness of all subordinate Terrain Map elements.

VerRegularity: A measure of the consistency of the VerticalSmoothness of the underlying level one map elements. If all included level one map elements have the same VerticalSmoothness, then VerRegularity is full scale 200.

AvgJaggyness: The average of the Jaggyness of all subordinate Terrain Map elements.

JagRegularity: A measure of the consistency of the Jaggyness of the underlying level one map elements. If all included level one map elements have the same Jaggyness, then JagRegularity is full scale 200.

AvgDegOfColor: The average of the DegreeOfColor of all subordinate Terrain Map elements.

ComDegOfColor: The most frequently occurring DegreeOfColor of all subordinate Terrain Map elements.

DegColorRegularity: A measure of the consistency of the DegreeOfColor of the underlying level one map elements. If all included level one map elements have the same DegreeOfColor, then DegColorRegularity is full scale 200.

PercentGreen: Percent of DirectionOfColor elements close to Green.

PercentCyan: Percent of DirectionOfColor between blue and Green.

PercentBlue: Percent of DirectionOfColor elements close to Blue.

PercentMagenta: Percent of DirectionOfColor elements between Blue and Red

PercentRed: Percent of DirectionOfColor elements close to Red.

PercentYellow: Percent of DirectionOfColor elements between Red and Green.

CommonDirColor: The most frequently occurring DirectionOfColor of all subordinate Terrain Map elements.

DirColorRegularity: A measure of the consistency of the DirectionOfColor of the underlying level-one map elements. If all included level one map elements have the same DirectionOfColor, then DirColorRegularity is full scale 200.

AvgAltDiff: Average of the AltDiff elements of the subordinate Terrain Map elements. (Altitude difference from foreground to background)

ComAltDiff: The most frequently occurring AltDiff of all subordinate Terrain Map elements.

AltDiffRegularity: A measure of the consistency of the AltDiff of the underlying level one map elements. If all included level one map elements have the same AltDiff, then AltDiff Regularity is full scale 200.

LevelVerSmoothness: VerticalSmoothness of this level from the same calculation as the level one map except use the AverageAltitudes of the next lower map level.

LevelHorSmoothness: HorizontalSmoothness of this level from the same calculation as the level one map except use the AverageAltitudes of the next lower map level.

LevelDegreeOfSlope: DegreeOfSlope as calculated from a 4×4 kernel of pixels for the level one Map except calculated from the 4×4 kernel of Map elements from the level below LevelDirectionSlope: DirectionOfSlope as calculated from a 4×4 kernel of pixels for the level one Map except calculated from the 4×4 kernel of Map elements from the level below.

Measurement of LevelDirectionSlope

The LevelDirectionSlope for each TMSE is calculated as a function of the lowest and highest of the bounding elements of the next lower level. In the example of a Hex Tree element in FIG. 3, the twelve outer elements are tested for the highest and lowest of AverageAltitude and the direction of slope is calculated by the vector from the center of the lowest element to the center of the highest element. The example of FIG. 3 illustrates nineteen vectors that can be derived where the low element is on a corner or on an edge adjacent to that corner. The 4×4 kernel of FIG. 3 can be rotated through three other positions so that the example vectors are in the other three corners to provide 76 total possible vectors from combinations of low and high boundary elements. The arrangement of a 4×4 kernel with 76 possible vectors allows a resolution of about five degrees of direction of slope.

Measurement of Flatness/Regularity and Common Element

Some of the Hex Tree Terrain Map elements are measurements of the consistency of the underlying level one map elements. All are scored such that if all included level one.

Map elements have the same value, and then Flatness/Regularity is set to the full-scale value of 200 (Percent*2).

The measurement technique is to create an array of long for value bins such as:

long ValueBins[256];

where there is one element (bin) for each possible value of the element.

The values of all of the underlying elements are checked and the bin for each element is incremented. For example if an AverageAltitude value of 25 is found then ++ValueBin[25].

After all associated Map elements have been tested, the bin with the largest number is the common element and the percent of the total elements in that bin determines the Regularity. The equation for Regularity is:

$$\text{Regularity} = 200 * \text{ValueBin[BinWithMaxValue]} / \text{TotalSamplesChecked} \qquad \text{Equation 1 Regularity Calculation}$$

The common element is ValueBin[BinWithMaxValue] which yields the most frequently occurring value.

Hex Tree Buffer Size

There are 36 elements here proposed, wherein two are two-byte shorts and the remainder are single byte values which provide 38 bytes per Hex Tree Map element.

The level one map is unchanged from 8 bytes with this Hex Tree scheme.

| Map Level | Pixels/Map element | Map Eles/ 320X240 buffer | Bytes |
|---|---|---|---|
| 1 | 4 | 19200 * 8 | 153600 |
| 2 | 64 | 1200 * 38 | 045600 |
| 3 | 1024 | 75 * 38 | 002850 |
| 4 | 16K | 4 * 38 | 000152 |
| 5 | 256K | 1 * 38 | 000038 |
| | | | 202,240 bytes |

A total of 202,240 bytes are thus required. An example of relative efficiency is:

A 320×240 color image buffer has 230,400 bytes. By comparison, a five-level Hex Tree in accordance with the present disclosure uses 202,240 bytes. This represents a relative usage factor of 88% (12% reduction in buffer size) but the data describing the content of the image is much richer but useful for purposes not served by raw image data.

In view of the foregoing, it will be seen that the several objects of the invention are achieved and other advantages are attained.

Although the foregoing includes a description of presently foreseeable best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A method for analysis of image data for subject content comprising:
   (a) performing at least one pass through a frame of said image data;
   (b) generating a base terrain map from said pass through said frame of said image data, said base terrain map comprising a plurality of base data members that indicate the content of said image data, the plurality of base data members being selected from the group consisting of an average altitude parameter, a degree of slope parameter, a direction of slope parameter, a horizontal smoothness parameter, a vertical smoothness parameter and a jaggyness parameter; and
   (c) generating at least one terrain map summary hierarchically removed from said terrain map, said at least one terrain map summary including a plurality of data members that summarize the content of said plurality of base data members.

2. The method of claim 1, wherein the at least one terrain map summary is a first terrain map summary, the method further comprising: generating a second terrain map summary having a plurality of data members that summarize the content of the data members of the first terrain map summary.

3. The method of claim 1, wherein the generating at least one terrain map summary includes generating four successively tiered terrain map summaries, the four successively tiered terrain map summaries and the base terrain map collectively define a hex tree terrain map structure in which the data members of each terrain map summary summarizes the data from a lower level terrain map summary from the five successively tiered terrain map summaries or the base terrain map.

4. The method of claim 3, wherein the data members of each least terrain map summary represent information derived from the base terrain map.

5. The method of claim 1, wherein the plurality of base data members includes:
   an average altitude parameter;
   a degree of slope parameter;
   a direction of slope parameter;
   a horizontal smoothness parameter;
   a vertical smoothness parameter; and
   a jaggyness parameter.

6. The method of claim 5, wherein the plurality of data members of the at least one terrain map summary includes:
   an AverageAltitude parameter,
   a Flatness parameter,
   a ComAltitude parameter,
   an AvgDegreeOfSlope parameter,
   a ComDegreeOfSlope parameter,
   a DegreeOfSlopeRegularity parameter,
   a PercentWithSlope parameter,
   a PercentVerSlope parameter,
   a PercentHorSlope parameter,
   a PercentAmbSlope parameter,
   an AvgHorSmoothness parameter,
   a ComHorSmoothness parameter,
   a HorRegularity parameter,
   an AvgVerSmoothness parameter,
   a ComVerSmoothness parameter,
   a VerRegularity parameter,
   an AvgJaggyness parameter,
   a JagRegularity parameter,
   an AvgDegOfColor parameter,
   a ComDegOfColor parameter,
   a DegColorRegularity parameter,
   a PercentGreen parameter,
   a PercentCyan parameter,
   a PercentBlue parameter,
   a PercentMagenta parameter,
   a PercentRed parameter,
   a PercentYellow parameter,
   a CommonDirColor parameter,
   a DirColorRegularity parameter,
   an AvgAltDiff parameter,
   a ComAltDiff parameter,
   an AltDiffRegularity parameter,
   a LevelVerSmoothness parameter,
   a LevelHorSmoothness parameter,
   a LevelDegreeOfSlope parameter, and
   a LevelDirectionSlope parameter.

7. A system of analysis of original image data for subject content, said system comprising:
   (a) a base terrain map generated from at least one pass through a frame of said image data, said base terrain map having a plurality of base data members that summarize the content of said image data, the plurality of base data members being selected from the group consisting of an average altitude parameter, a degree of slope parameter, a direction of slope parameter, a horizontal smoothness parameter, a vertical smoothness parameter and a jaggyness parameter; and
   (b) at least one terrain map summary hierarchically removed from said terrain map, said at least one terrain map summary including a plurality of data members that summarize the content of said base data members.

8. The system of claim 7, wherein the at least one terrain map summary is a first terrain map summary, the system further comprising: a second terrain map summary having a plurality of data members that summarize the content of the first terrain map summary.

9. The system of claim 7, wherein the at least one terrain map summary is a terrain map summary from a plurality of terrain map summaries, the plurality of terrain map summaries and the base terrain map being hierarchically arranged in a five-tier hex tree terrain map summary element structure in which each successively higher level terrain map summary summarizes the data of a next lower terrain map summary from the plurality of terrain map summaries or the base terrain map.

10. The system of claim 9, wherein said terrain map includes a plurality of image parameters that summarize the content of said original image data, said parameters including an average altitude parameter; a degree of slope parameter; a direction of slope parameter; a horizontal smoothness parameter; a vertical smoothness parameter; and a jaggyness parameter.

11. A data analysis terrain map summary elements structure comprising:
a base terrain map data structure generated from at least one pass through a frame of original image data,
said base terrain map including a plurality of base data members that indicate the content of said image data, the plurality of base data members being selected from the group consisting of an average altitude parameter, a degree of slope parameter, a direction of slope parameter, a horizontal smoothness parameter, a vertical smoothness parameter and a jaggyness parameter;
and a set of tiered terrain map summaries hierarchically successively removed from the base terrain map,
each terrain map summary from the set of tiered terrain map summaries having a plurality of members that summarize content of members of the terrain map summary immediately below it or content of the plurality of base data members of the base terrain map.

12. A non-transitory processor-readable medium storing code representing instructions configured to cause a processor to:
define a plurality of portions of a frame of a video image, the frame of the video image including a plurality of pixels, each portion from the plurality of portions including pixels from the plurality of pixels of the frame;
receive a plurality of pixel values, each pixel value being associated with a pixel from the plurality of pixels;
calculate values for a plurality of base data members using pixel values associated with the pixels of each portion from the plurality of portions, the plurality of base data members summarizing the pixel values associated with the pixels of each portion from the plurality of portions of the frame;
define a plurality of groups, each group from the plurality of groups including at least two portions from the plurality of portions; and
calculate values for a plurality of summary data members that summarize the base data members of the at least two portions within each group from the plurality of groups.

13. The processor-readable medium of claim 12, wherein the plurality of base data members includes an average pixel value for the pixel values associated with the pixels of each portion from the plurality of portions,
the plurality of summary data members including an average of the average pixel values of the at least two portions within each group, a measure of a consistency of the average pixel values of the at least two portions within each group, and a most frequently occurring average pixel value of the at least two portions within each group.

14. The processor-readable medium of claim 12, wherein the plurality of base data members includes a color degree parameter that indicates how far an average color of the pixels of a portion from the plurality of portions is from grey scale,
the plurality of summary data members including an average of values of the color degree parameters of the at least two portions within each group, a measure of a consistency of values of the color degree parameters of the at least two portions within each group, and a measure of a most frequently occurring value of the color degree parameters of the at least two portions within each group.

15. The processor-readable medium of claim 12, wherein the plurality of base data members includes a color direction parameter that indicates a tint of the color of the portion of the frame,
the plurality of summary data members including a parameter indicating the percentage of values of the color direction parameters from the at least two portions within each group that are within a predetermined range of color values.

16. The processor-readable medium of claim 12, wherein the plurality of base data members includes a color direction parameter that indicates a tint of the color of the portion of the frame,
the plurality of summary data members including a measure of a consistency of values of the color direction parameters of the at least two portions within each group and a most frequently occurring value of the color direction parameters of the at least two portions within each group.

17. The processor-readable medium of claim 12, wherein the plurality of base data members includes an average pixel value for the pixel values associated with the pixels within each portion from the plurality of portions,
the plurality of summary data members including a consistency of change in a horizontal direction of the average pixel values of the at least two portions within each group and a consistency of change in a vertical direction of the average pixel values of the at least two portions within each group.

18. The processor-readable medium of claim 12, wherein the plurality of base data members includes a horizontal smoothness parameter to determine a consistency of change in a horizontal direction of the pixel values associated with the pixels within each portion from the plurality of portions,
the plurality of summary data members including an average of values of the horizontal smoothness parameters of the at least two portions within each group, a measure of a consistency of values of the horizontal smoothness parameters of the at least two portions within each group, and a most frequently occurring value of the horizontal smoothness parameters of the at least two portions within each group.

19. The processor-readable medium of claim 12, wherein the plurality of base data members includes a vertical smoothness parameter to determine a consistency of change in a vertical direction of the pixel values associated with the pixels within each portion from the plurality of portions,
the plurality of summary data members including an average of values of the vertical smoothness parameters of the at least two portions within each group, a measure of a consistency of values of the vertical smoothness parameters of the at least two portions within each group, and a most frequently occurring value of the vertical smoothness parameters of the at least two portions within each group.

20. The processor-readable medium of claim 12, the code further comprising code representing instructions configured to cause a processor to:

segment a target from the frame of the video image, the target having a plurality of odd fields interlaced with a plurality of even fields, the plurality of base data members including a jaggyness parameter for the target, the jaggyness parameter indicating an offset in pixels between the plurality of odd fields of the target and the plurality of even fields of the target within each portion from the plurality of portions, the plurality of summary data members including an average of values of the jaggyness parameters of the at least two portions within each group and a measure of a consistency of values of the jaggyness parameters of the at least two portions within each group.

21. The processor-readable medium of claim 12, wherein the plurality of base data members includes a color degree parameter that indicates how far an average color of the pixels of a portion from the plurality of portions is from grey scale and a color direction parameter that indicates a tint of the color of the portion of the frame, the plurality of summary data members including:
   an average of values of the color degree parameters of the at least two portions within each group,
   a measure of a consistency of values of the color degree parameters of the at least two portions within each group,
   a measure of a most frequently occurring value of the color degree parameters of the at least two portions within each group,
   a parameter indicating the percentage of values of the color direction parameters from the at least two portions within each group that are within a predetermined range of color values,
   a measure of a consistency of values of the color direction parameters of the at least two portions within each group, and
   a most frequently occurring value of the color direction parameters of the at least two portions within each group.

22. The processor-readable medium of claim 12, wherein the plurality of base data members includes an average pixel value for the pixel values associated with the pixels within each portion from the plurality of portions, a horizontal smoothness parameter to determine a consistency of change in a horizontal direction of the pixel values associated with the pixels within each portion from the plurality of portions, and a vertical smoothness parameter to determine a consistency of change in a vertical direction of the pixel values associated with the pixels within each portion from the plurality of portions, the plurality of summary data members including:
   a consistency of change in a horizontal direction of the average pixel values of the at least two portions within each group,
   a consistency of change in a vertical direction of the average pixel values of the at least two portions within each group,
   an average of values of the horizontal smoothness parameters of the at least two portions within each group,
   a measure of a consistency of values of the horizontal smoothness parameters of the at least two portions within each group,
   a most frequently occurring value of the horizontal smoothness parameters of the at least two portions within each group,
   an average of values of the vertical smoothness parameters of the at least two portions within each group,
   a measure of a consistency of values of the vertical smoothness parameters of the at least two portions within each group, and
   a most frequently occurring value of the vertical smoothness parameters of the at least two portions within each group.

23. The processor-readable medium of claim 12, the code further comprising code representing instructions configured to cause a processor to:

segment a target from the frame of the video image, the target having a plurality of odd fields interlaced with a plurality of even fields, the plurality of base data members including:
   a color degree parameter that indicates how far an average color of the pixels of a portion from the plurality of portions is from grey scale,
   a color direction parameter that indicates a tint of the color of the portion of the frame,
   an average pixel value for the pixel values associated with the pixels within each portion from the plurality of portions,
   a horizontal smoothness parameter to determine a consistency of change in a horizontal direction of the pixel values associated with the pixels within each portion from the plurality of portions,
   a vertical smoothness parameter to determine a consistency of change in a vertical direction of the pixel values associated with the pixels within each portion from the plurality of portions,
   a jaggyness parameter for the target, the jaggyness parameter indicating an offset in pixels between the plurality of odd fields of the target and the plurality of even fields of the target within each portion from the plurality of portions, the plurality of summary data members including:
   an average of values of the color degree parameters of the at least two portions within each group,
   a measure of a consistency of values of the color degree parameters of the at least two portions within each group,
   a measure of a most frequently occurring value of the color degree parameters of the at least two portions within each group,
   a parameter indicating the percentage of values of the color direction parameters from the at least two portions within each group that are within a predetermined range of color values,
   a measure of a consistency of values of the color direction parameters of the at least two portions within each group,
   a most frequently occurring value of the color direction parameters of the at least two portions within each group,
   a consistency of change in a horizontal direction of the average pixel values of the at least two portions within each group,
   a consistency of change in a vertical direction of the average pixel values of the at least two portions within each group, an average of values of the horizontal smoothness parameters of the at least two portions within each group, a measure of a consistency of values of the horizontal smoothness parameters of the at least two portions within each group, a most frequently occurring value of the horizontal smoothness parameters of the at least two portions within each group, an average of values of the vertical smoothness parameters of the at least two portions within each group, a measure of a consistency of values of the vertical smoothness parameters of the at least two portions within each group, a most frequently occurring value of the vertical smoothness parameters of the at least two portions within each group, an average of the average pixel values of the at least two portions within each group, a measure of a consistency of the average pixel values of the at least two portions within each group, a most frequently occurring average pixel value of the at least two portions within each group, an average of values of the jaggyness parameters of the at least two portions within each group, and a measure of a consistency of values of the jaggyness parameters of the at least two portions within each group.

* * * * *